May 17, 1955
O. G. BLOCHER ET AL
2,708,366
APPARATUS FOR MEASURING FLUID FLOW
Filed Aug. 31, 1950
2 Sheets-Sheet 1
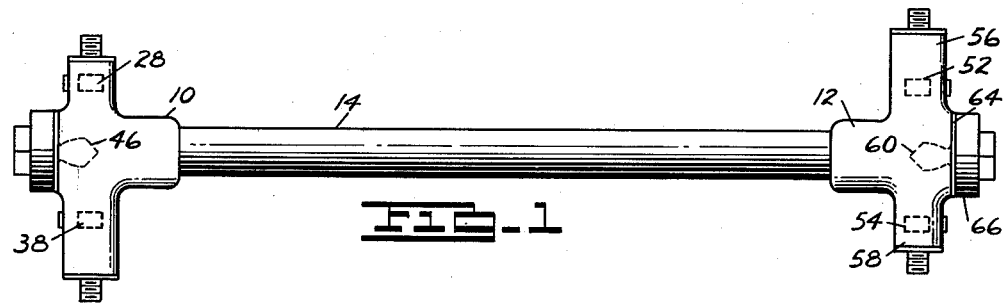
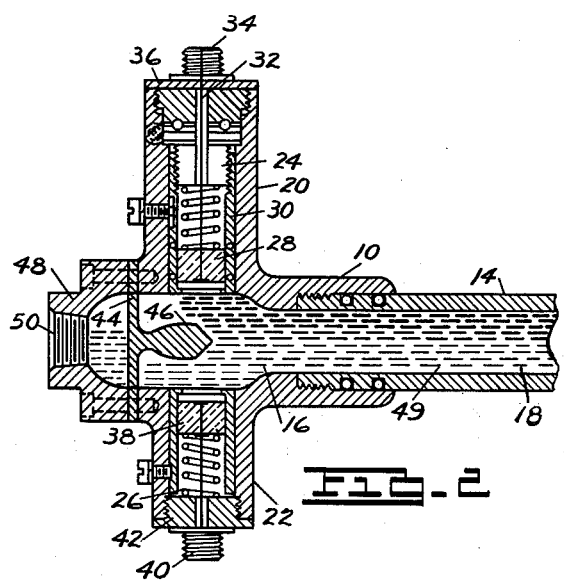
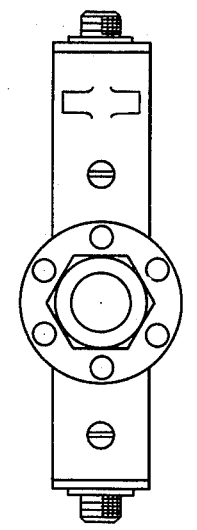
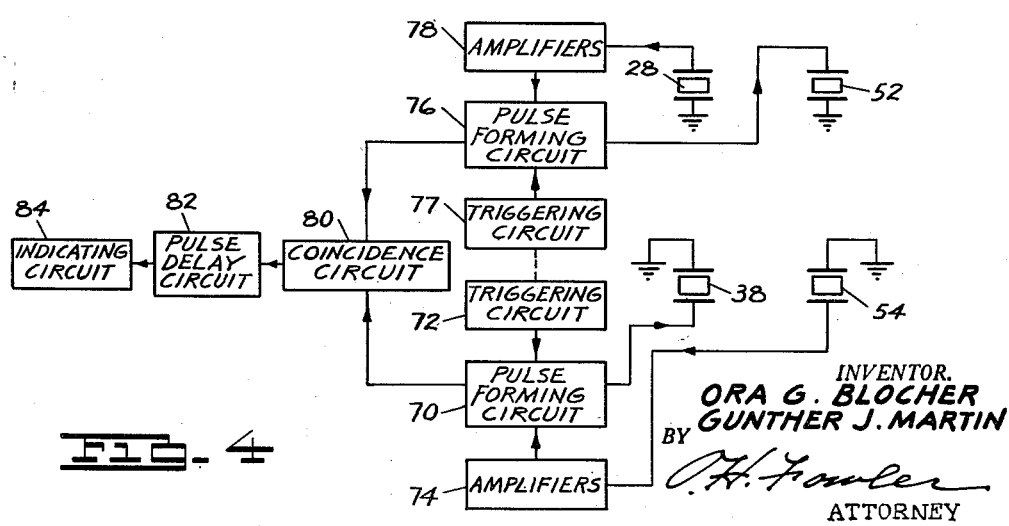
INVENTOR.
ORA G. BLOCHER
GUNTHER J. MARTIN
BY
ATTORNEY

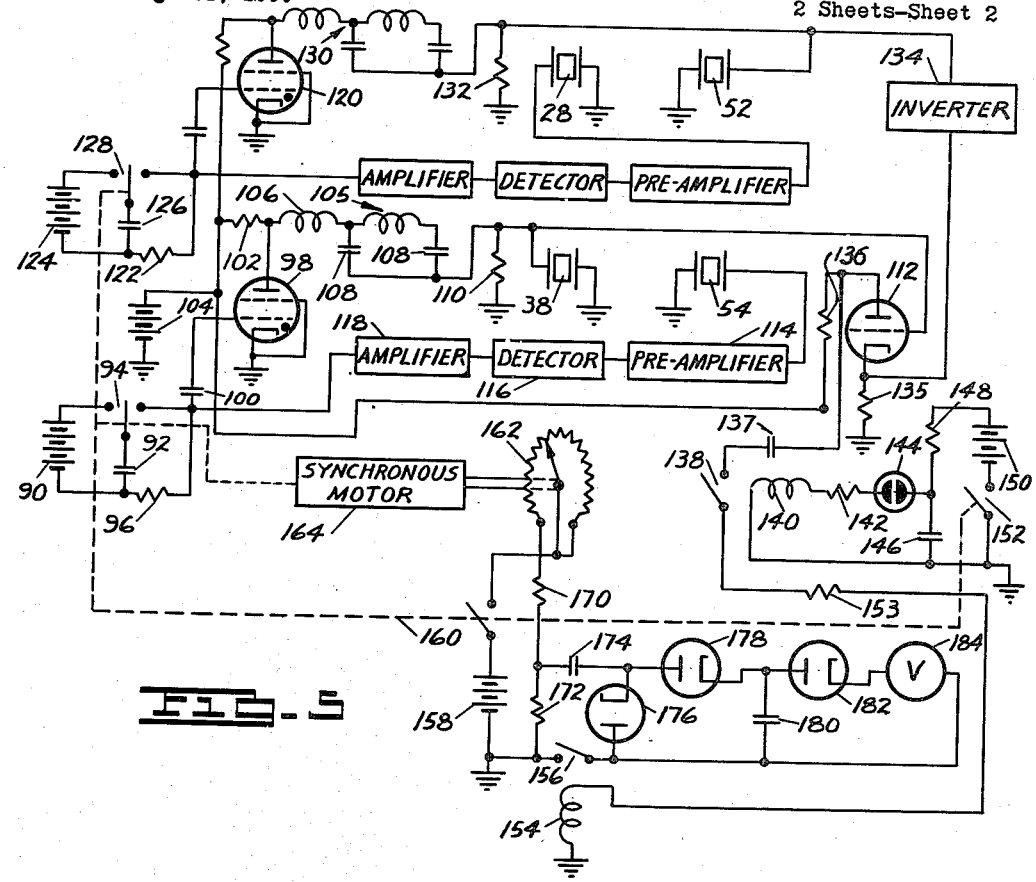
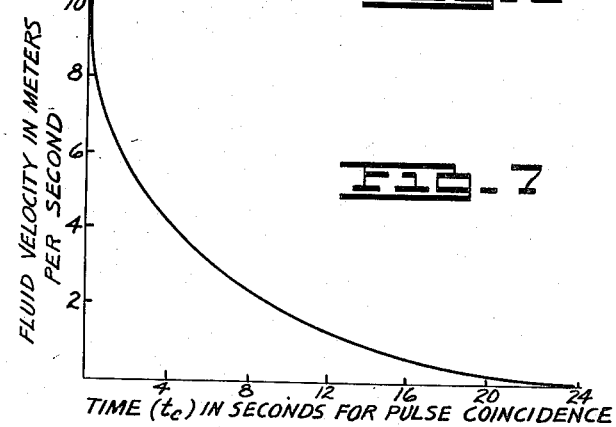

United States Patent Office 2,708,366
Patented May 17, 1955

2,708,366

APPARATUS FOR MEASURING FLUID FLOW

Ora G. Blocher, Dearborn, and Gunther J. Martin, Ann Arbor, Mich.

Application August 31, 1950, Serial No. 182,596

16 Claims. (Cl. 73—194)

This invention relates to apparatus for measuring the speed of a fluid and more particularly to apparatus for accurately measuring the speed of a fluid over a wide range of values and without the necessity of using any moving parts.

The apparatus now in use for measuring the speed of a fluid is unsatisfactory for several reasons. The apparatus is incapable of measuring fluid speeds over the complete range of values which may be encountered and is especially unsatisfactory at speeds approaching zero. The apparatus also fails to compensate for errors resulting from changes in such conditions as temperature, pressure and density in the medium surrounding the apparatus. Because of its moving parts, the apparatus may not have a long life or, at the least, may require constant adjustment and calibration as the parts wear down and erode.

This invention provides apparatus which satisfies the above requirements as well as many others. The apparatus is capable of measuring the speed of a fluid, whether liquid or gas, from very low to very high values and is especially effective at fluid speeds approaching zero. The apparatus eliminates all errors from changes in the conditions of the surrounding medium by simultaneously making two measurements, both of which are equally affected by the medium, and then comparing the measurements. In case the speed of the fluid changes while a measurement is being made, the apparatus provides an indication of the average fluid speed during the measurement. In addition to having no moving parts to affect the accuracy of measurement, the apparatus does not restrict or disturb the fluid flow in any way. Thus, it measures a true fluid flow rather than the transient flow condition associated with apparatus employing floats or orifices. The invention provides apparatus for producing the above advantages.

An object of this invention is to provide apparatus for accurately measuring the speed of a fluid over a wide range of values.

Another object of the invention is to provide apparatus of the above character for providing an indication of fluid speed without being affected by changes in the condition of the medium surrounding the apparatus.

A further object is to provide apparatus of the above character having no moving parts to affect its performance and no poorly located parts to disturb the flow of the liquid through it.

Still another object is to provide apparatus of the above character for providing an indication of the average fluid speed in case the speed varies during the measurement.

A still further object is to provide apparatus of the above character which is simple, efficient, reliable and relatively inexpensive.

Other objects and advantages will be apparent from a detailed description of the invention and from the appended drawings and claims.

In the drawings:

Figure 1 is a front elevational view of the mechanical features of the invention;

Figure 2 is an enlarged, fragmentary, front elevational view, partly in section, illustrating in further detail some of the features shown in Figure 1;

Figure 3 is an enlarged side elevational view of the features shown in Figure 2;

Figure 4 is a block diagram of the electrical features of the invention;

Figure 5 is a circuit diagram, partly in block form, showing in some detail an embodiment of the block diagram illustrated in Figure 4;

Figure 6 is a schematic diagram illustrating the time relationship of the various pulses which travel through the fluid whose speed is to be measured; and Figure 7 is a curve showing the relationship of the fluid speed to the time required for the coincidence of pulses.

In one embodiment of the invention, fittings 10 and 12 screw on opposite ends of a tube 14 and have central cavities 16 which communicate with a hole 18 extending through the tube 14 and providing a channel for the fluid flow. Nozzles 20 and 22 integral with the fitting 10 extend from opposite sides of the fitting and have holes 24 and 26, respectively, which communicate with the cavity 16. A transducer such as a crystal 28 supported by a holder 30 is adjustably positioned within the hole 24 for the reception of sonic signals and an electrical connection 32 is made to the crystal 28 from a co-axial connector 34. The connector 34 is attached to a plug 36 which screws into the nozzle 20.

A transducer such as a crystal 38 is similarly provided in the hole 26 for the transmission of sonic signals and is electrically connected to a co-axial connector 40 attached to a plug 42 which screws into the end of the nozzle 22. A baffle 44 having a deflector 46 is pinned against the fitting 10 by a cover 48 having an orifice 50 in communication with the cavity 16 to provide an inlet for the introduction of a fluid 49 into the tube 14.

In like manner, a transmitting transducer such as a crystal 52 and a receiving transducer such as a crystal 54 are provided in nozzles 56 and 58, respectively, integral with the fitting 12. A deflector 60 on a baffle 64 is positioned within the cavity 16 to direct the passage of sonic energy between the crystals and the tube 14. The baffle 64 and a cover 66 having an orifice for the passage of fluid from the tube 14 are suitably connected to the tube.

The transmitting crystals 38 and 52 and the receiving crystals 28 and 54 are connected in the electrical circuit shown in Figure 4. The transmitting crystal 38 is connected to the output side of a pulse forming circuit 70, the input side of which is connected to a triggering circuit 72. The receiving crystal 54 is connected to amplifier stages 74, the output from which is introduced to the pulse forming circuit 70. Similarly, the transmitting crystal 52 is provided with signals from a pulse forming circuit 76. The pulse forming circuit 76 is initially activated by a triggering circuit 77 synchronized with the triggering circuit 72 and is subsequently triggered by signals from amplifier stages 78 connected to the receiving crystal 28. The outputs from the pulse forming circuits 70 and 76 are introduced to a coincidence amplifier 80 connected through a delay circuit 82 to an indicator circuit 84, which is activated simultaneously with the pulse forming circuits 70 and 76.

When the pulse forming circuits 70 and 76 are initially activated by the triggering circuits 72 and 77, respectively, they energize the transmitting crystals 38 and 52, respectively. The crystal 38 sends a pulse of sonic energy through the tube 14 in the same direction as the flow of the fluid 49, and the crystal 52 sends a pulse through the tube in the opposite direction. After the pulses travel through the fluid, they are directed by the deflectors 60 and 46 to the crystals 54 and 28, respectively, and fed back into the pulse forming circuits 70 and 76, respectively. A regenerative circuit is thus provided to transmit pulses through the tube in a repetitive pattern.

Because of the slight help provided by the fluid flow, the pulses travelling in the direction of fluid flow do not require as long a time to reach their receiving crystal as the pulses travelling in the opposite direction. Thus, by regenerating the pulses, the pulses formed by the circuit 76 gradually fall in time behind the pulses from the circuit 70. At a time dependent upon the speed of the fluid as it flows through the tube 14, a pulse is produced in the circuit 76 in coincidence with a pulse from the circuit 70. The coincidence circuit 80 then operates to produce a signal in the indicator 84, as will be explained in detail hereinafter, and this signal provides a direct indication of the fluid speed.

A specific example of the electronic circuits disclosed above is shown in Figure 5. The circuits include a battery 90 connected to a capacitance 92 and to a stationary contact of a single-pole, double-throw switch 94. The capacitance 92 is connected between the movable contact of the switch 94 and a resistance 96, which is in turn connected to the other stationary contact of the switch 94. The battery 90, the capacitance 92, the switch 94 and the resistance 96 act as the triggering circuit 72 shown in Figure 4.

The grid of a gas filled tube 98, such as a hydrogen thyratron tube, is connected through a coupling capacitance 100 to the resistance 96. The cathode and shield grid of the tube 98 are grounded and the plate is supplied through a resistance 102 with positive voltage from a suitable power supply, such as a battery 104, the negative terminal of which is grounded. The plate of the tube 98 is also connected to a resonant charging circuit, generally indicated at 105, having a plurality of series inductances 106 and a plurality of capacitances 108 connected at one side to the inductances 106 and at the other side to one another. A grounded resistance 110 is connected to the common side of the capacitances 108 as well as to the transmitting crystal 38 and the grid of a tube 112 in a coincidence circuit.

A pre-amplifier 114, a detector 116 and an amplifier 118 are provided in cascade arrangement with the receiving crystal 54. The output from the amplifier 118 is in turn introduced through the coupling capacitance 100 to the grid of the tube 98 to trigger the tube.

Similarly, the grid of a gas-filled tube 120 is connected through a coupling capacitance to a resistance 122, which forms a triggering circuit with a battery 124, a capacitance 126 and a switch 128 ganged to the switch 94. A resonant charging circuit, generally indicated at 130, and a resistance 132 are connected across the tube 120, and the resistance 132 is connected to the transmitting crystal 52 and the input side of an inverter stage 134, the output side of the inverter being connected to the cathode of the tube 112. The grid of the tube 120 is supplied with pulses from the receiving crystal 28 through amplifier and detector stages similar to those disclosed above.

A resistance 135 is connected between the cathode of the tube 112 and ground to provide a positive bias on the cathode. The plate of the tube 112 is supplied through a relatively large resistance 136 with positive voltage from the battery 104 and is connected through a capacitance 137 to a normally open switch 138 associated with a solenoid 140. The solenoid 140 is in a circuit corresponding to the pulse delay circuit 82 and is in series with a resistance 142, a neon bulb 144 and a capacitance 146. A resistance 148, a battery 150 and a normally open switch 152 ganged to the switch 94 are provided in series with the capacitance 146.

The switch 138 is connected in series with a resistance 153 and a solenoid 154. The solenoid 154 is associated with a switch 156 which controls the operation of a circuit corresponding to the indicating circuit 84. The indicating circuit includes a suitable supply of constant direct voltage, such as a battery 158, the positive terminal of which is connected through a switch 160 to the movable arm of a potentiometer 162 and the negative terminal of which is grounded. The switch 160 is ganged to the switch 94.

The movable arm of the potentiometer 162 is driven by a synchronous motor 164 which is adapted to operate simultaneously with the closing of the switch 94. One side of the potentiometer 162 is connected to the movable arm and the other side is connected to a resistance 170 in series with a grounded resistance 172. A capacitance 174 is provided between the resistance 172 and the cathode of a diode 176. The plate of the diode 176 is connected to the movable contact of the switch 156, the stationary contact of which is also grounded.

The plate of a diode 178 is connected to the cathode of the diode 176, and the cathode of the diode 178 is connected to a capacitance 180 and to the plate of a diode 182. A meter 184 is connected between the cathode of the diode 182 and the capacitance 180.

With the movable contacts of the switches 94 and 128 engaging their left stationary contacts, the batteries 90 and 124 charge the capacitances 92 and 126, respectively. When the movable contacts of the switches 94 and 128 are moved to their right stationary contacts, the capacitances 92 and 126 discharge through the resistances 96 and 122, respectively, and produce positive voltages on the grids of the tubes 98 and 120, respectively.

Although the grids of the tubes 98 and 120 are normally biased below cut-off, the positive pulses from the capacitances 92 and 126 cause the tubes to conduct. The tubes then provide a discharge path for the resonant charging circuits 105 and 130, which discharge in a pulse of large amplitude and short duration. The resultant current pulses through the resistances 110 and 132 produce a voltage differential across each of the transmitting crystals 38 and 52, and the transmitting crystals send pulses in opposite directions through the fluid 49. Because of the motion of the fluid 49, the receiving crystal 54 receives the pulse from the crystal 38 slightly before the crystal 28 receives the pulse from the crystal 52.

During the time that the pulses are travelling through the fluid 49, the resonant charging circuits are recharged by the battery 104 and are able to discharge through the gas-filled tubes when the received pulses are introduced again to the grids of the tubes. Thus, a sequence of pulses is transmitted by each of the crystals 38 and 52, such that successive pulses from the crystal 52, designated at 186 in Figure 6, lag by an increasing time interval the corresponding pulses from the crystal 38, designated at 188.

At a time dependent upon the speed of the fluid 49, a pulse from the crystal 38 coincides in time with a pulse from the crystal 52 because the crystal 38 has transmitted an integral number of pulses more than the crystal 52. When coincidence occurs, the pulse across the resistance 110 drives the voltage on the grid of the tube 112 positive at the same time that the pulse across the resistance 132, when inverted, drives the voltage on the cathode in a negative direction. The double action on the tube 112 causes the tube, which is normally cut off, to conduct and current flows through the switch 138 and the solenoid 154.

Since the switch 138 is open when the movable contacts of the switches 94 and 128 are moved to their right stationary contacts, the coincidence of the initial current pulses through the tubes 98 and 120 cannot produce a current through the solenoid 154 to close the switch 156. When the movable contacts of the switches 94 and 128 are moved to the right, the switch 152 is closed and the capacitance 146 is quickly charged by the battery 150 to a voltage which causes the neon bulb 144 to break down. Current then flows through a circuit which includes the capacitance 146, the neon bulb 144, the resistance 142 and the solenoid 140, causing the switch 138 to close and a continuous circuit to be established to the solenoid 154. The current through the solenoid 140 is produced almost instantaneously after the formation of the initial pulses in the tubes 98 and 120. Thus, the circuit through the switch 138 and the solenoid 154 is is instantaneously prepared for the formation of a subsequent pulse of current through the tube 112.

When current flows from the tube 112 through the solenoid 154, the switch 156 closes and completes a circuit which includes the resistance 172, the capacitance 174, the diode 178, the capacitance 180 and the switch 156. The capacitance 174, the diode 176 and the diode 178 form a positive counting circuit for charging the capacitance 180 to a voltage which is a logarithmic function of the voltage across the resistance 172. However, the voltage on the resistance 172 is dependent upon the time required to produce coincidence between pulses from the crystals 38 and 52. The reason for this is that the synchronous motor 164 drives the movable arm of the potentiometer 162 at a constant rate and in a direction to gradually increase the effective resistance provided across the battery 158 by the potentiometer 162 and the resistances 170 and 172. As the effective resistance across the battery 158 increases, the voltage on the resistance 172 decreases in a substantially hyperbolic relationship. This voltage produces in the meter 184 an indication which is directly proportional to the speed of the fluid 49.

The time required for a pulse to travel from the crystal 38 to the crystal 54 may be indicated as follows:

$$T_1 = \frac{L_1}{C+u} \quad (1)$$

where $T_1$ = the time in seconds,
$L_1$ = the distance in meters between the crystals 38 and 54,
$C$ = the velocity of sound in the fluid in meters/second when the fluid has no speed, and
$u$ = the speed, in meters/second, at which the fluid flows through the tube 14.

Similarly, the time required for a pulse to travel from the crystal 52 to the crystal 28 may be given by the following relationship:

$$T_2 = \frac{L_2}{C-u} \quad (2)$$

where $T_2$ = the time in seconds, and
$L_2$ = the distance in meters between the crystals 52 and 28.

If the crystal 52 has to transmit $n_c$ pulses before coincidence is obtained between the pulses through the gas filled tubes 98 and 120, then $$t_c = n_c \left(\frac{L_2}{C-u}\right) \quad (3)$$

where $t_c$ = the time in seconds for producing coincidence
$n_c$ = the number of pulses which the crystal 52 transmits to produce coincidence.

But the number of pulses $n_c$ required for coincidence is dependent upon the difference in time required for the pulses to travel in the direction of fluid flow and in the opposite direction. This relationship is expressed in the following manner:

$$n_c = \frac{T_1}{T_2 - T_1} \quad (4)$$

Substituting Equation 2 in Equation 4, $$n_c = \frac{T_1}{\frac{L_2}{C-u} - T_1} \quad (5)$$

When the above expression for $n_c$ is substituted in Equation 3, $$t_c = \frac{T_1\left(\frac{L_2}{C-u}\right)}{\frac{L_2}{C-u} - T_1} \quad (6)$$

Solving Equation 6 for $u$, $$u = C - \frac{L_2}{T_1} + \frac{L_2}{t_c} \quad (7)$$

If Equation 1 is substituted for $T_1$ in Equation 6, $$u = C - \frac{L_2(C+u)}{L_1} + \frac{L_2}{t_c} \quad (8)$$

Solving Equation 8 for $u$, $$u = C\left(\frac{L_1 - L_2}{L_1 + L_2}\right) + \frac{1}{t_c}\left(\frac{L_2 L_1}{L_1 + L_2}\right) \quad (9)$$

Although the adjustable positioning of the crystal 28 causes the distance $L_2$ to be variable, $L_2$ always equals or closely approaches $L_1$. If the assumption is made that $L_1 = L_2$, then Equation 9 may be simplified to the following expression:

$$u = \frac{L_2}{2t_c} \quad (10)$$

During the time $t_c$ required to produce coincidence, the resistance provided by the potentiometer 162 in the series circuit which includes the potentiometer and the resistances 170 and 172 may be expressed as $Kt_c$, where $K$ is a constant dependent upon the resistance value of the potentiometer and the speed at which the potentiometer arm is driven by the synchronous motor 164. Thus, at the time $t_c$, the voltage across the resistance 172 may be given by the following relationship:

$$e_{172} = \frac{E_0 R_{172}}{Kt_c + R_{170} + R_{172}} \quad (11)$$

where $e_{172}$ = the voltage across the resistance 172.
$E_0$ = the voltage supplied by the battery 158.
$R_{172}$ = the value of the resistance 172, and
$R_{170}$ = the value of the resistance 170.

Solving Equation 11 for $t_c$, $$t_c = \frac{1}{K}\left(\frac{E_0 R_{172} - e_{172} R_{170} - e_{172} R_{172}}{e_{172}}\right) \quad (12)$$

When the value of $t_c$ in Equation 12 is substituted in Equation 10, $$u = \frac{L_2 K e_{172}}{2(E_0 R_{172} - e_{172} R_{170} - e_{172} R_{172})} \quad (13)$$

The meter 184 is calibrated to indicate the values for $u$, previously defined as the speed of the fluid 49, corresponding to the different values for $e_{172}$, the voltage across the resistance 172.

By measuring the time required for two series of pulses travelling in opposite directions to coincide, indications can be accurately obtained for fluid speeds from values approaching zero to very high values. The accuracy of the indications is enhanced by the fact that there are no moving parts to disturb the flow of the fluid and to require constant adjustment and calibration. Furthermore, the apparatus does not indicate transient conditions in the fluid as the true fluid speed but rather integrates a plurality of pulse measurements to provide a determination of the average fluid speed during the time required to obtain coincidence between the two sets of pulses. Because of the comparison between the oppositely directed pulses, the measurement is independent of such conditions as temperature, pressure and humidity in the surrounding medium.

It should be appreciated that the circuits including the pre-amplifier 114, the detector 116 and the amplifier 118 can be considered as feedback means to introduce the signals received at the crystal 54 back to the crystal 38. Similarly, components including the resonant charging circuit 105 and the tube 98 can be considered as means for producing a regeneration of the pulses traveling through the associated feedback circuit so as to produce a further transmission of pulses. As shown in Figure 5, two similar feedback means and two similar regenerative means are provided.

Although this invention has been disclosed and illustrated with reference to particular applications, the principles involved are susceptible of numerous other applications which will be apparent to persons skilled in the art. The invention is, therefore, to be limited only as indicated by the scope of the appended claims.

What is claimed is:

1. Apparatus for measuring the speed of a fluid, including, means providing a flow path for the fluid, first and second transmitting means for simultaneously sending a pair of pulses in the same direction as and in the oposite direction to the flow path, first and second means for receiving the pulses at the end of their travel paths, first and second means for providing feed-back paths between the first receiving and transmitting means and between the second receiving and transmitting means, first and second electrical circuits connected to the transmitting means for regenerating the pulses traveling through the feedback paths to provide for the transmission of first and second pulse series in opposite directions through the flow path, and means connected to the first and second transmitting means for determining the coincidence time in the transmission of pulses in the first and second series after the first pair of transmitted pulses to provide an indication of the fluid speed, the last mentioned means including a circuit for producing a voltage having an amplitude variable with time.

2. Apparatus for measuring the speed of a fluid, including, a channel for the flow of fluid, first and second means for simultaneously transmitting first and second pulses in the same direction as, and in the opposite direction to, the fluid flow, first and second means for receiving the first and second pulses after their flow through the channel, first and second means for providing feedback paths between the first receiving and transmitting means and between the second receiving and transmitting means for the pulses passing to the receiving means, first and second means connected between the first transmitting and feedback means and between the second transmitting and feedback means for regenerating the pulses upon their travel through the feedback paths, means including a coincidence circuit connected to the first and second transmitting means and operative at the coincidence of the oppositely directed pulses after the first and second pulses to provide a signal, and means including a capacitance-charging circuit responsive to the coincidence signal to provide an output voltage having an amplitude dependent upon the time required to produce the coincidence.

3. Apparatus for measuring the speed of a fluid, including, a channel for the flow of the fluid, a first transducer for sending first pulses through the channel in the same direction as the fluid flow, a second transducer for receiving the pulses after their passage through the channel, a first circuit for feeding back to the first transducer the pulses received by the second transducer, means connected to the first transducer for regenerating for further transmission through the channel the pulses fed back from the second transducer to the first transducer, a third transducer for sending second pulses through the channel in the oppoite directon to the fluid flow, a fourth transducer for receiving the second pulses after their passage through the channel, a second circuit for feeding back to the third transducer the pulses received by the fourth transducer, means connected to the third transducer for regenerating the second pulses upon their travel through the second feedback path, a circuit connected to the first and third transducers for producing a coincidence signal upon the simultaneous transmission of pulses by the transducers after the first pulse transmitted by each of the first and third transducers, and a circuit actuated by the coincidence signal to provide a signal having an amplitude inversely proportional to the time required to produce coincidence.

4. Apparatus for measuring the speed of a fluid, including, means providing a flow path for the fluid, a first pair of transducers for simultaneously sending a pair of pulses in the same direction as and in the opposite direction to the flow path, a second pair of transducers for receiving the pulses at the end of their travel paths, first and second means for feeding back to the first pair of transducers the pulses received by the second pair of transducers, first and second means connected to the first pair of transducers for regenerating the pulses traveling through the feedback circuits to provide for the transmission of first and second pulse series through the flow path, a circuit connected to the first pair of transducers and operative upon a coincidence in the transmission of pulses in the first and second series after the initial transmission of pulses by the first pair of transducers to produce a signal, and a circuit actuated by the coincidence signal to provide a voltage having an amplitude indicative of fluid speed.

5. Apparatus for measuring the speed of a fluid, including, a channel for the flow of the fluid, a first pair of transducers for simultaneously transmitting pulses in the same direction as, and in the opposite direction to, the fluid flow, a second pair of transducers for receiving the pulses after their flow through the channel, means for feeding back to the first pair of transducers the pulses received by the second pair of transducers, means connected to the first pair of transducers for regenerating the pulses upon their travel through the feedback means, a circuit connected to the first pair of transducers and operative to produce a signal upon a coincidence in the transmission of oppositely directed pulses after the initial transmision of pulses by the first pair of transducers, a circuit for producing a voltage having an amplitude dependent upon the time between the initial transmission of pulses in the opposite directions and their subsequent coincidence, an indicator, and a circuit connected to the voltage producing circuit and actuated by the coincidence signal to introduce the voltage to the indicator for an indication of the value of fluid flow.

6. Apparatus for measuring the speed of a fluid, including, a channel for the flow of fluid, a first pair of transducers for simultaneously transmitting pulses in the same direction as, and in the opposite direction to, the fluid flow, a second pair of transducers for receiving the pulses after their flow through the channel, means interconnecting said pairs of transducers to introduce to said first pair of transducers for further transmission the pulses received by the respective cooperating transducers of said second pair, a circuit operative upon the simultaneous transmission of the first pulses in each direction to produce a voltage having an inverse relationship with respect to the time after such transmission, a circuit connected to the first pair of transducers and operative to produce a signal upon a coincidence between the transmission of pulses traveling in opposite directions after the first transmission of pulses by the first pair of transducers, and a circuit connected to said first mentioned circuit and actuated by the coincidence signal to provide an indication of the inverse voltage at the time of coincidence.

7. Apparatus for measuring the speed of a fluid, including, means providing a flow path for the fluid, a first pair of transducers at opposite ends of the flow path for sending a first series of pulses through the flow path in the direction of fluid flow and for receiving the pulses after travel through the flow path, a second pair of transducers at opposite ends of the flow path for sending a second series of pulses through the flow path in the opposite direction to the fluid flow and for receiving the pulses after travel through the flow path, a first circuit connected to the first pair of transducers for providing for the further transmission of the pulses in the first series after their reception, a second circuit connected to the second pair of transducers for providing for the further transmission of the pulses in the second series after their reception, a third circuit connected to the sending transducers in the first and second pairs and operative upon a coincidence in the transmission of pulses in the first and second series after the initial transmission of pulses by the first pair of transducers to produce a control signal, a fourth circuit operative to produce a voltage having an amplitude dependent upon the time between the initial transmission of the pulses and the production of the control signal, and a fifth circuit connected to said fourth circuit and actuated by the control signal to convert the voltage into an indication of the fluid speed.

8. Apparatus for measuring the speed of a fluid, including, a channel for the flow of the fluid, a first transducer for sending first pulses through the channel in the same direction as the fluid flow, a second transducer for receiving the pulses after their passage through the channel, a first feedback circuit connected between the second transducer and the first transducer, means connected to the first feedback circuit and the first transducer to produce a regeneration of the pulses traveling through the feedback circuit for further transmission through the channel, a third transducer for sending second pulses through the channel in the opposite direction to the fluid flow, a fourth transducer for receiving the second pulses after their passage through the channel, a second feedback circuit connected between the fourth transducer and the third transducer, means connected to the second feedback circuit and the third transducer to produce a regeneration of the second pulses upon their travel through the second feedback circuit, a first circuit connected to the first and third transducers and operative upon a coincidence in the transmission of the regenerated first and second pulses after the initial transmission of pulses by the first and third transducers to produce a control signal, a second circuit for providing a signal having an amplitude inversely proportional to the time from the initial transmission of the first and second pulses, and a third circuit connected to the second circuit and actuated by the control signal to provide an indication of fluid flow dependent upon the amplitude of the inverse voltage at the time of the control signal.

9. Apparatus for measuring the speed of a fluid, including, means providing a flow path for the fluid, first and second means for simultaneously sending a first pair of pulses in the same direction as and in the opposite direction to the flow path, first and second means for receiving the first and second pulses at the end of their travel paths, first and second means for providing feedback paths between the first receiving and sending means and between the second sending and receiving means, first and second means connected between the sending means and the feedback means for regenerating the pulses traveling through the first and second feedback means to provide for the transmission of first and second pulse series in opposite directions through the flow path, a motor having a predetermined speed, electrical circuitry including a variable impedance and a capacitance, means for obtaining a simultaneous initiation in the operation of the motor and the transmission of the first pair of pulses, means driven by the motor and connected to the impedance for varying its impedance value, means connected to the first and second sending means and operative upon a coincidence in the transmission of pulses in the first and second series after the initial transmission of the first pair of pulses by the first and second sending means to obtain the production across the capacitance of a voltage having an amplitude dependent upon the value of the variable impedance at the time of such coincidence, and means in the circuit responsive to the voltage produced across the capacitance to provide an indication of the speed of fluid flow.

10. Apparatus for measuring the speed of a fluid, including, a channel for the flow of the fluid, a first pair of transducers for simultaneously transmitting pulses in the same direction as, and in the opposite direction to, the fluid flow, a second pair of transducers for receiving the pulses after their flow through the channel, a pair of feedback means connected between the transducers in the first and second pairs for introducing the received pulses back to the first pair of transducers, first and second means connected between the first pair of transducers and the pair of feedback means for regenerating the pulses upon their travel through the feedback means, a motor having a predetermined speed, a first circuit including a variable impedance operative by the motor to provide an impedance variable in a predetermined manner with respect to the time at which the pulses are first transmitted, a second circuit connected to the first pair of transducers and operative upon a coincidence in the transmission of oppositely traveling pulses after the initial transmission of pulses by the first pair of transducers to produce a signal, and a third circuit connected to the first circuit and actuated by the coincidence signal to produce an output voltage having an amplitude dependent upon the value of the variable impedance at the time of the production of the coincidence signal.

11. Apparatus for measuring the speed of a fluid, including, means providing a flow path for the fluid, a first pair of transducers at opposite ends of the flow path for sending a first series of pulses through the flow path in the direction of fluid flow and for receiving the pulses after travel through the flow path, a second pair of transducers at opposite ends of the flow path for sending a second series of pulses through the flow path in the direction opposite to the fluid flow and for receiving the pulses after travel through the flow path, a first circuit connected between the first pair of transducers to provide for the further transmission of the pulses in the first series after their reception, a second circuit connected between the second pair of transducers to provide for the further transmission of the pulses in the second series after their reception, a coincidence amplifier connected to the sending transducers in the first and second pairs and operative upon the simultaneous transmission of pulses after the initial sending of pulses in the series of oppositely directed pulses to produce a coincidence signal, a constant speed motor, means for initiating the operation of the motor at the instant of the initial transmission of pulses, a circuit including a variable impedance driven by the motor for providing a variable impedance having a value dependent upon the time from the initial transmission of pulses, an indicator, and switching means actuated by the signal from the coincidence amplifier to couple the variable impedance to the indicator for providing an indication of the fluid flow.

12. Apparatus for measuring the speed of a fluid, including, means providing a flow path for the fluid, a first pair of transducers at opposite ends of the flow path for sending a first series of pulses through the flow path in the direction of fluid flow and for receiving the pulses after travel through the flow path, a second pair of transducers at opposite ends of the flow path for sending a series of pulses through the flow path in the opposite direction to the fluid flow and for receiving the pulses after travel through the flow path, a first circuit connected between the first pair of transducers to provide for the further transmission of the pulses in the first series after their reception, a second circuit connected between the second pair of transducers to provide for the further transmission of the pulses in the second series after their reception, a motor having a predetermined speed, a circuit including a variable impedance driven by the motor to provide an impedance having a value variable in a predetermined manner with respect to the time at which the pulses are first transmitted, a circuit connected to the variable impedance to provide a signal having an amplitude dependent upon the variable impedance, and a circuit connected to the sending transducers in the first and second pairs and operative upon a coincidence in the sending of oppositely traveling pulses after the initial sending of pulses by the sending transducers to convert the signal into an indication of the fluid speed.

13. Apparatus for measuring the speed of a fluid, including, means providing a flow path for the fluid, a first pair of transducers at opposite ends of the flow path for sending a first series of pulses through the flow path in the direction of fluid flow and for receiving the pulses after their travel through the flow path, a second pair of transducers at opposite ends of the flow path for sending a second series of pulses through the flow path in the direction opposite to the fluid flow and for receiving the pulses after travel through the flow path, a first circuit connected between the first pair of transducers to provide for the further transmission of pulses in the first series after their reception, a second circuit connected between the second pair of transducers to provide for the further transmission of the pulses in the second series after their reception, a circuit connected to the sending transducers in the first and second pairs for producing a signal upon a coincidence between the sending of oppositely traveling pulses, means in the coincidence circuit for preventing the production of a signal for a coincidence in the initial transmission of the oppositely traveling pulses, a circuit including a variable impedance for producing an output signal having an amplitude dependent upon the difference in time between the initial transmission of the oppositely traveling pulses and their subsequent simultaneous transmission, an indicator, and means actuated by the coincidence signal and connected to the indicator to introduce the output signal to the indicator for an indication of the value of fluid flow.

14. Apparatus for measuring the speed of a fluid, including, means providing a flow path for the fluid, first and second means for simultaneously sending a pair of pulses in the same direction as and in the opposite direction to the flow path, first and second means for receiving the pair of pulses at the end of their travel paths, first and second means respectively connected between the first sending and receiving means and between the second sending and receiving means for feeding back the received pulses to the sending means, first and second means respectively connected between the first feedback and sending means and between the second feedback and sending means for producing a regeneration of the pulses traveling through the feedback means to provide for the transmission of first and second pulse series through the flow path, a motor having a predetermined speed, means including a variable impedance driven by the motor for producing a first impedance varying linearly with respect to the time from the initial pulse transmission, a second impedance, a voltage source, means, including the first and second impedances connected across the voltage source, an indicator, a circuit connected between the first and second sending means and operative upon a coincidence in the transmission of oppositely traveling pulses after the initial sending of pulses by the first and second sending means to produce a coincidence signal, and means actuated by the coincidence signal for introducing the voltage across the second impedance to the indicator for an indication of the value of fluid flow.

15. Apparatus for measuring the speed of a fluid, including, means providing a flow path for the fluid, a first pair of transducers at opposite ends of the flow path for sending a first series of pulses through the flow path in the direction of fluid flow and for receiving the pulses after travel through the flow path, a second pair of transducers at opposite ends of the flow path for sending a second series of pulses through the flow path in the direction opposite to the fluid flow and for receiving the pulses after travel through the flow path, a first circuit connected between the first pair of transducers to provide for the further transmission of the pulses in the first series after their reception, a second circuit connected between the second pair of transducers to provide for the further transmission of the pulses in the second series after their reception, a motor having a predetermined speed, means including a variable impedance driven by the motor for producing an impedance increasing linearly with respect to time, a second impedance connected in series with the first impedance, a voltage source connected across the first and second impedances, an indicator, a circuit connected to the sending transducers in the first and second pairs for producing a signal upon a coincidence in the transmission of pulses in the first and second series after the initial transmission of pulses by the sending transducers, and switching means actuated by the coincidence signal to introduce the voltage across the second impedance to the indicator for an indication of the value of fluid flow.

16. Apparatus for measuring the speed of a fluid, including, a channel for the flow of the fluid, a first transducer for sending first pulses through the channel in the same direction as the fluid flow, a second transducer for receiving the pulses after their passage through the channel, a first circuit connected to the first and second transducers to provide for the further transmission of the first pulses upon their reception, a third transducer for sending second pulses through the channel in the direction opposite to the fluid flow, a fourth transducer for receiving the second pulses after their passage through the channel, a second circuit connected between the third and fourth transducer to provide for the further transmission of the second pulses upon their reception, a motor having a predetermined speed, means including a variable impedance driven by the motor for producing an impedance varying linearly with respect to time, a second impedance connected in series with the first impedance, a source of voltage connected across the first and second impedances, a coincidence amplifier connected to the first and third transducers and operative upon the simultaneous transmission of oppositely traveling pulses after the initial sending of pulses by the first and third transducers to produce a signal, an indicator, and a circuit actuated by the coincidence signal to electrically couple the second impedance to the indicator for an indication of the value of fluid flow.

References Cited in the file of this patent

UNITED STATES PATENTS

| | | |
|---|---|---|
| 1,864,638 | Chilowsky | June 28, 1932 |
| 1,881,543 | Hartig et al. | Oct. 11, 1932 |
| 2,015,933 | Hartig | Oct. 1, 1935 |
| 2,151,203 | Hartig | Mar. 21, 1939 |
| 2,274,262 | Wolff | Feb. 24, 1942 |
| 2,513,668 | Parker et al. | July 4, 1950 |
| 2,515,221 | Henning | July 18, 1950 |
| 2,534,712 | Gray | Dec. 19, 1950 |

FOREIGN PATENTS

| | | |
|---|---|---|
| 623,022 | Great Britain | May 11, 1949 |